United States Patent
Sarma et al.

(10) Patent No.: US 6,302,536 B1
(45) Date of Patent: Oct. 16, 2001

(54) FAST DRYING INK JET INK COMPOSITIONS FOR CAPPING INK JET PRINTER NOZZLES

(75) Inventors: Deverakonda Sarma, Danbury; John Rosenberger, Plantsville, both of CT (US); James E. Fox, Stratford-on-Avon; Allan L. Hudd, Nuthampstead, both of (GB)

(73) Assignee: Trident International, Inc., Brookfield, CT (US)

( * ) Notice: Subject to any disclaimer, the term of this patent is extended or adjusted under 35 U.S.C. 154(b) by 0 days.

(21) Appl. No.: 09/328,653

(22) Filed: Jun. 9, 1999

Related U.S. Application Data

(63) Continuation-in-part of application No. 08/903,016, filed on Jul. 31, 1997.

(51) Int. Cl.[7] .................................................. G01D 11/00
(52) U.S. Cl. .............................................. 347/100; 347/101
(58) Field of Search .................... 347/100, 101; 106/31–58

(56) References Cited

U.S. PATENT DOCUMENTS

| | | | |
|---|---|---|---|
| 3,925,789 | 12/1975 | Biggs et al. | 346/75 |
| 4,142,905 | 3/1979 | Cooke | 106/22 |
| 4,176,361 | 11/1979 | Kawada | 347/100 |
| 4,266,232 | 5/1981 | Juliana, Jr. et al. | 346/140 R |
| 4,290,072 | 9/1981 | Mansukhani | 346/1.1 |
| 4,340,896 | * 7/1982 | Cruz-Uribe et al. | 347/85 |
| 4,361,843 | 11/1982 | Cooke et al. | 346/1.1 |
| 4,365,998 | * 12/1982 | Sugiyama et al. | 106/31.49 |
| 4,393,386 | * 7/1983 | Di Giulio | 347/106 |
| 4,459,601 | 7/1984 | Howkins | 346/140 R |
| 4,540,997 | 9/1985 | Biggs et al. | 346/140 R |
| 4,597,794 | 7/1986 | Ohta | 347/100 |
| 4,646,106 | 2/1987 | Howkins | 346/1.1 |
| 4,791,165 | 12/1988 | Bearss | 347/100 X |
| 4,824,485 | 4/1989 | Tanaka et al. | 106/22 |
| 4,970,527 | 11/1990 | Gatten | 346/1.1 |
| 4,971,626 | 11/1990 | Kveglis et al. | 106/23 |
| 5,006,170 | 4/1991 | Schwarz et al. | 106/20 |

(List continued on next page.)

FOREIGN PATENT DOCUMENTS

| | | |
|---|---|---|
| 0 688 835 A2 | 12/1995 | (EP) . |
| 0 688 835 A3 | 12/1995 | (EP) . |
| WO 96/24642 | 8/1996 | (EP) . |
| 2 148 316 A | 5/1985 | (GB) . |

OTHER PUBLICATIONS

U.S. application No. 08/903,016, Rosenberger et al., filed Jul. 31, 1997.
U.S. application No. 09/328,860, Sarma et al., filed Jun. 9, 1999.
U.S. application No. 09/541,957, Rosenberger et al., filed Apr. 4, 2000.
U.S. application No. 09/328,652, Sarma et al., filed Jun. 6, 1999.

Primary Examiner—John Barlow
Assistant Examiner—Manish S. Shah
(74) Attorney, Agent, or Firm—Woodcock Washburn Kurtz Mackiewicz & Norris LLP

(57) ABSTRACT

Methods and apparatus are provided for preventing clogging in impulse inkjet printers. It has been found in accordance with the invention that ink clogging during quiescent periods can be prevented by providing an ink that has the property of forming a barrier of higher viscosity ink where the ink contacts the ambient air. As a result, the viscous barrier shields the remaining ink from the effects of air exposure during the quiescent period. Thereafter, the barrier is removed by a series of sub-pulses that re-homogenize the viscosity barrier and clear the nozzle.

22 Claims, 5 Drawing Sheets

U.S. PATENT DOCUMENTS

| | | | |
|---|---|---|---|
| 5,154,761 | | 10/1992 | Cooke ................................ 347/100 X |
| 5,156,675 | * | 10/1992 | Breton et al. ......................... 347/100 |
| 5,160,535 | * | 11/1992 | Cooke et al. ......................... 347/100 |
| 5,258,774 | | 11/1993 | Rogers ................................. 346/1.1 |
| 5,310,778 | | 5/1994 | Shor et al. ........................... 524/556 |
| 5,316,575 | | 5/1994 | Lent et al. ......................... 106/20 R |
| 5,329,293 | | 7/1994 | Liker ..................................... 347/11 |
| 5,376,169 | | 12/1994 | Hotomi ............................. 347/100 X |
| 5,507,864 | | 4/1996 | Jaeger et al. ....................... 106/22 A |
| 5,538,548 | | 7/1996 | Yamazaki ........................... 106/20 C |
| 5,580,704 | * | 12/1996 | Yoshida et al. ...................... 430/331 |
| 5,581,283 | | 12/1996 | Rogers .................................. 347/40 |
| 5,594,044 | | 1/1997 | Yang .................................... 523/160 |
| 5,604,276 | | 2/1997 | Suga .................................... 524/100 |
| 5,658,376 | | 8/1997 | Noguchi et al. .................. 106/31.43 |
| 5,663,217 | * | 9/1997 | Kruse ................................... 347/100 |
| 5,667,571 | | 9/1997 | Ono et al. ......................... 106/31.48 |
| 5,674,923 | | 10/1997 | Subbaraman et al. ............... 523/160 |
| 5,679,138 | | 10/1997 | Bishop et al. ..................... 106/20 C |
| 5,710,195 | | 1/1998 | Subbaraman et al. ................ 524/31 |
| 5,718,746 | | 2/1998 | Nagasawa et al. ................ 106/31.9 |
| 5,746,817 | | 5/1998 | Katsen et al. .................... 106/31.65 |
| 5,767,873 | | 6/1998 | Rogers et al. ......................... 347/40 |
| 5,779,778 | * | 7/1998 | Gregory et al. .................. 106/31.58 |
| 5,781,214 | | 7/1998 | Vonasek et al. ....................... 347/95 |
| 5,837,042 | | 11/1998 | Lent et al. ........................ 106/31.14 |
| 5,843,219 | | 12/1998 | Griffin et al. ..................... 106/31.88 |
| 5,846,307 | | 12/1998 | Nagasawa et al. .............. 106/31.75 |
| 5,877,235 | | 3/1999 | Sakuma et al. ...................... 523/161 |
| 5,891,231 | | 4/1999 | Gnerlich et al. .................. 106/31.86 |
| 5,912,281 | | 6/1999 | Clark et al. .......................... 523/161 |
| 5,913,971 | | 6/1999 | Fujimatsu et al. ................ 106/31.86 |

* cited by examiner

FAST DRYING INK JET INK COMPOSITIONS FOR CAPPING INK JET PRINTER NOZZLES

CROSS REFERENCE TO RELATED ART

This application is a continuation-in-part of U.S. application Ser. No. 08/903,016, filed Jul. 31, 1997, the disclosure of which is hereby incorporated by reference in its entirety.

FIELD OF THE INVENTION

The present invention relates to ink jet printers and, more particularly, to methods and apparatus for preventing ink clogging in such devices.

BACKGROUND OF THE INVENTION

Ink jet printing is performed by discharging ink droplets from a print head to a substrate. The droplets are ejected through orifices or nozzles in the print head and are directed to the substrate to form an image thereon. In contrast to many other types of printing, there preferably is no contact between the printer and the substrate with ink jet printing.

Most of the ink jet printers known in the art may be characterized as either continuous or impulse devices, depending upon the mechanism by which the ink droplets are directed to the substrate. In continuous in jet systems, an essentially uninterrupted stream of ink is ejected from a nozzle and breaks up into droplets. The droplets bear an electric charge so that they can be deflected by an applied electric field which is modulated according to the particular image to be recorded. The electric field directs the droplets toward either the substrate or an ink re-circulating reservoir.

With so-called "impulse" or "drop-on-demand" inkjet printers, image formation is controlled by selectively energizing and de-energizing, for example, a piezoelectric transducer or solenoid rather than by modulating an applied electric field. Ink is stored in the print head or nozzle until it is necessary to form an image on the substrate. The printer is then activated by print signals to apply pressure to the ink and discharge a selected number of discrete ink droplets toward the substrate.

Because ink is ejected from impulse-type printers only periodically, these devices present a number of problems which typically are not encountered in continuous ink jet systems. These problems, which occur during the relatively short intervals between individual print signals during a single print cycle, include irregularly shaped drops and/or improper spacing of drops. The root cause of these problems may be attributable to movement of the ink meniscus at the time a print signal is generated, particularly where efforts are made to print at a frequency in excess of 3 KHz. One approach to these problems is presented by U.S. Pat. No. 4,266,232, in the name of Juliana, Jr., et aL, which discloses an impulse printer wherein ink drops of substantially uniform size and spacing are generated by applying drive pulses in a mutually synchronous fashion at every one of predetermined equal intervals. The amplitude of the drive pulses is controlled so that the amplitude of the drive pulse is below that of a print signal when no drop is to be formed. An even better approach is presented by U.S. Pat. No. 4,459,601, in the name of Howkins, wherein a fill-before-fire mode of operation is disclosed, i.e., a pulse of predetermined length is used to initiate filling of the jet chamber and firing of a droplet occurs on the trailing edge of the pulse.

Certain other problems associated with impulse ink jet printers relate to the considerably longer intervals between print cycles. Unlike continuous ink jet printers, impulse devices typically are maintained in stand-by or quiescent modes for relatively long intervals, sometimes on the order of seconds, minutes, and even hours. During these intervals, ink is allowed to stand, thicken due to evaporation of ink components, and possibly clog the nozzles of the print head. Impulse printers may begin a printing cycle with such thickened material in place. Many of the start-up problems encountered with impulse printers are attributable to ink which has been allowed to clog the nozzles during quiescent periods. Ink clogging is less of a concern in continuous systems because there typically are fewer interruptions in the flow of ink and any such interruption is of considerably shorter duration. Even where ink is allowed to stand and solidify in a continuous ink jet printer, it is more easily purged due to the considerably higher pressures at which these devices operate.

A number of methods and apparatus are known in the art for preventing clogging in ink jet printers during quiescent periods. For example, U.S. Pat. No. 4,970,527, in the name of Gatten, discloses an inkjet printer which prevents clogging by printing a few ink dots when the printer is idle. The method of Gatten, however, wastes both ink and printing substrate.

U.S. Pat. No. 3,925,789, in the name of Kashio, discloses an ink jet recording device which comprises a timer for determining the length of a quiescent period and a means for preliminarily ejecting ink from a nozzle if the quiescent period exceeds a predetermined amount of time. The ejected ink is not directed to a printing substrate but, rather, to an ink collector.

U.S. Pat. No. 4,540,997, in the names of Biggs, et al., discloses an inkjet printer wherein clogging is minimized by transporting the nozzles during quiescent periods to communicate with a wash station and then ejecting ink from the nozzles into the wash station if the printer has not functioned for a predetermined period of time.

U.S. Pat. No. 5,329,293, in the name of Liker, discloses an ink jet printer apparatus wherein clogging is minimized by pulsing the ink in the nozzle during quiescent periods. The pulsing signal provided is less than the size of a pulse signal that would cause ink to eject from the nozzle. This techniques is referred to as sub-pulsing. The sub-pulsing method and apparatus are effective and efficient in preventing ink from clogging the nozzle. However, with some extremely fast-drying inks, the sub-pulsing leads to constant evaporation of solvents from the ink. As a result, all of the ink within the nozzle may suffer an increase in viscosity during the sub-pulsing period. Eventually the viscosity my increase too much and adversely effect the operation of the printer.

Therefore, there exists a need for relatively simple methods and apparatus for preventing ink jet clogging with faster drying inks which do not waste ink or printing substrate and which do not require additional devices such as ink collectors and washing stations.

SUMMARY OF THE INVENTION

The present invention provides fast-drying inkjet ink compositions for use inn impulse inkjet printer. The fast-drying ink compositions comprise from about 20 to about 95 percent by weight of a solvent that is preferably either a glycol alkyl ether having about 3 to 20 carbon atoms, a ketone alcohol, 1,4-butanediol, denatured ethanol, benzyl alcohol, alkyl lactates, or mixtures thereof. The fast-drying ink jet ink compositions also comprise from about 1 to about 20 percent by weight of a polymeric resin. The polymeric resin preferably is either a polyester resin, a polyvinylbuterol resin, a phenolic resin, an acrylic resin, or mixtures thereof The fast-drying ink jet ink compositions also comprise from about 1 to about 20 percent by weight of a colorant.

It has been found in accordance with the invention that ink clogging during quiescent periods can be prevented by providing an ink that has the property of forming a barrier of higher viscosity ink where the ink contacts the ambient air. As a result, this viscosity barrier shields the remaining ink from the effects of air exposure during the quiescent period. Thereafter, the barrier is removed by a series of sub-pulses that re-homogenize the viscosity barrier and thereby clears the nozzle.

BRIEF DESCRIPTION OF THE DRAWINGS

The numerous objects and advantages of the present invention may be better understood by those skilled in the art by reference to the accompanying figures, in which.

DETAILED DESCRIPTION OF THE INVENTION

Figure 1:
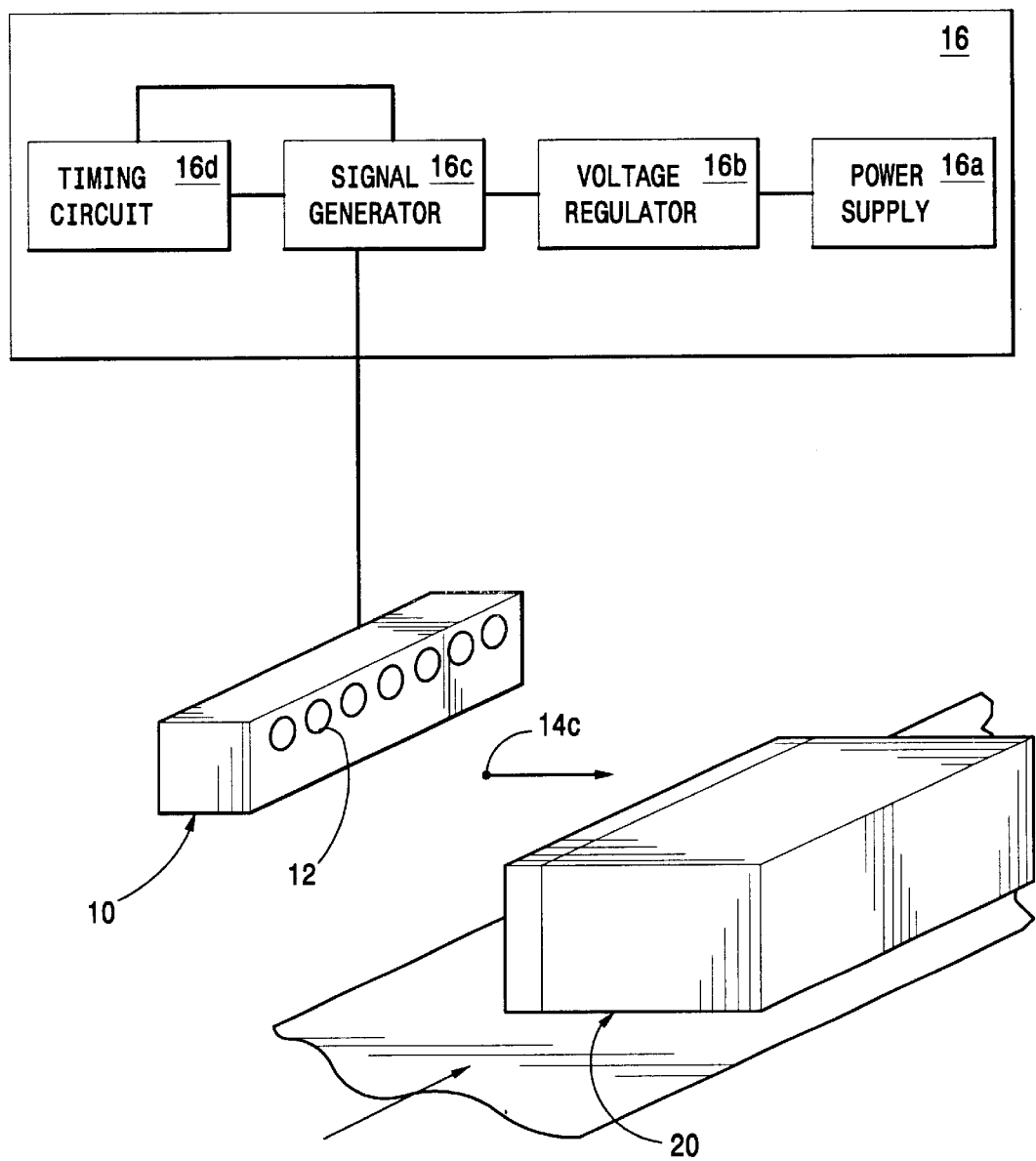
FIG. 1 is a diagram showing an impulse ink jet printing apparatus according to the present invention.

The methods and apparatus of the present invention can be used in conjunction with virtually any impulse or "drop-on-demand" inkjet printer which is subject to stand-by or quiescent periods. Referring to FIG. 1, a representative printing apparatus according to the present invention is shown comprising a print head 10 having a plurality of nozzles 12 and control means 16 electrically coupled with the print head.

Any of the wide variety of print heads known in the art may be employed in the present invention, so long as it comprises at least one nozzle which ejects ink droplets in response to control signals. It is preferred that the print head be of the piezoelectric type, more preferably an MICRO-CODER 32/16 or maybe an ULTRAJET 11 192/32 liquid ink jet imaging print head, both of which are commercially available from Trident, Inc. of Brookfield, Conn.

The control means 16 may be any of those known in the art to be capable of generating control signals. As shown in FIG. 1, control means 16 preferably comprises a power source 16a, a voltage or current regulator 16b, a signal generator 16c, and a timing circuit 16d for determining the interval between firing signals. It is preferred that a voltage regulator be employed and that the signal generator generate signals initiated under software control. Control means amenable to the practice of this invention include computing devices such microprocessors, microcontrollers, capacitors, switches, circuits, logic gates, or equivalent logic devices. Preferred control means 16 include a personal computer coupled to a Trident 16-Channel Analog Driver Board, part number 016-7008-01, which is commercially available from Trident, Inc. The preferred driverboard generates a control signal in the form of an RC time constant controlled waveform with a 14.5$\mu$ second leading pulse followed by a 1.5$\mu$ second off time and a 3.5$\mu$ second trailing pulse. U.S. patent application Ser. No. 08/823,718, filed Mar. 25, 1997 and entitled "High Performance Impulse Ink Jet Method and Apparatus," which is incorporated herein by reference, discloses firing waveforms for ejecting ink from an ink jet nozzle and includes the preferred firing pulse of the present invention.

Figure 2A:
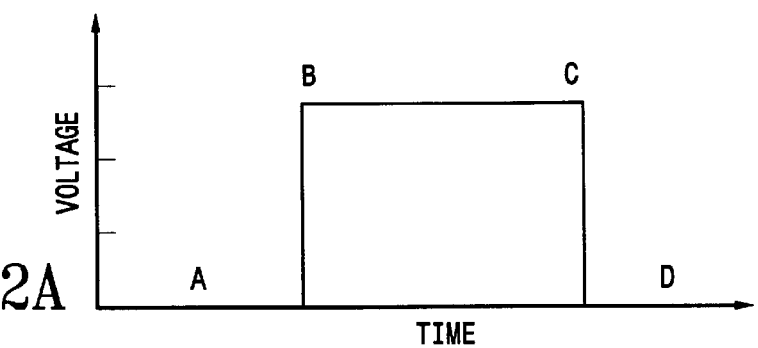
FIG. 2 is a diagram showing a firing signal applied to a print head nozzle and the movement of ink within the nozzle in response to the signal.
Figure 2B:
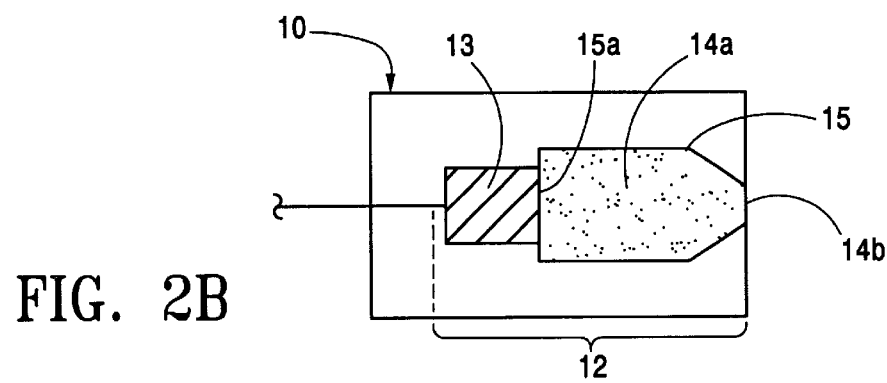
Figure 2C:
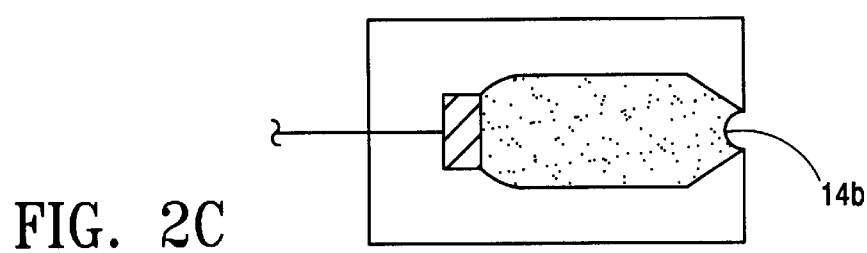
Figure 2D:
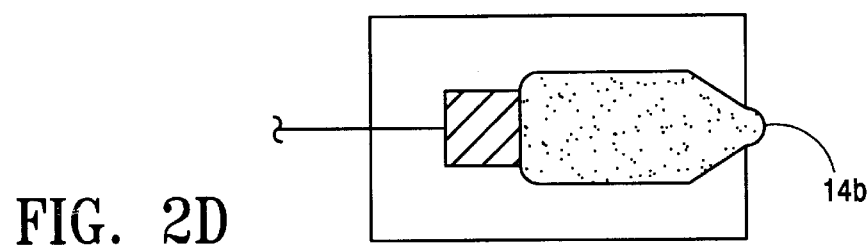
Figure 2E:
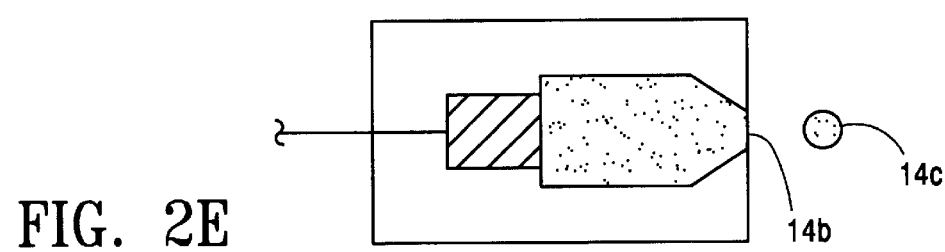

As shown in FIGS. 1 and 2A–2E, one or more ink droplets 14c can be ejected from the nozzles 12 toward substrate 20 by selectively energizing and de-energizing piezoelectric transducers 13. In preferred embodiments, each transducer 13 is attached to a membrane, sealant, or some other flexible member 15a in physical contact with a volume of ink 14a contained within chamber 15. The transducers are energized and de-energized through application of control signals. Although the control signal waveform could be selected from many known ink droplet firing signals, for brevity and simplicity of understanding, the firing control signal is shown in FIG. 2A in the form of a square wave.

Figure 3A:
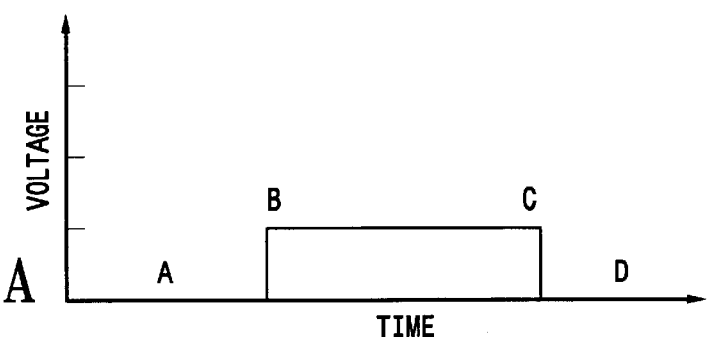
FIG. 3 is a diagram showing a sub-firing signal applied to a print head nozzle and the movement of ink within the nozzle in response to the signal.
Figure 3B:
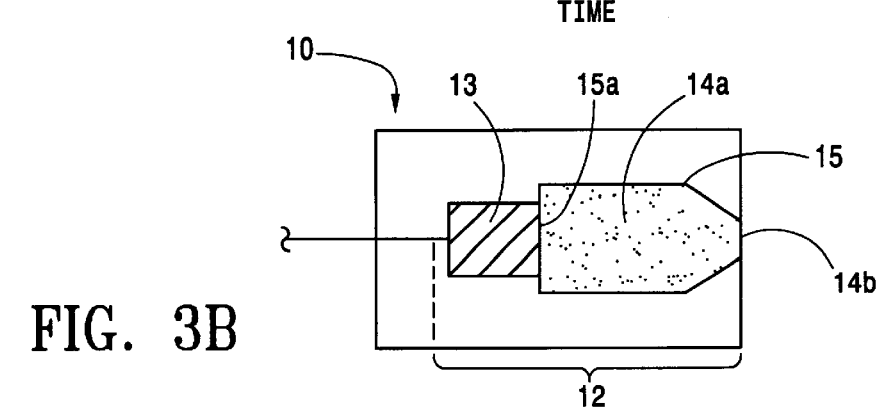
Figure 3C:
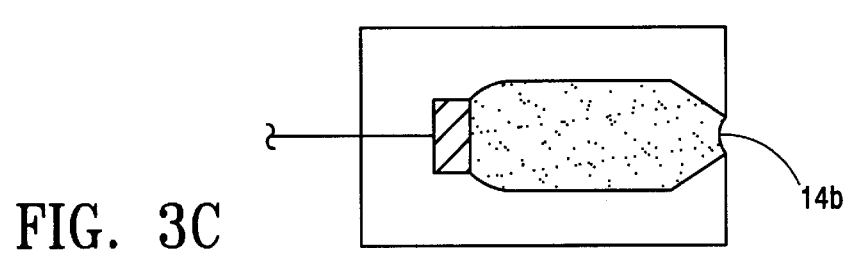
Figure 3D:
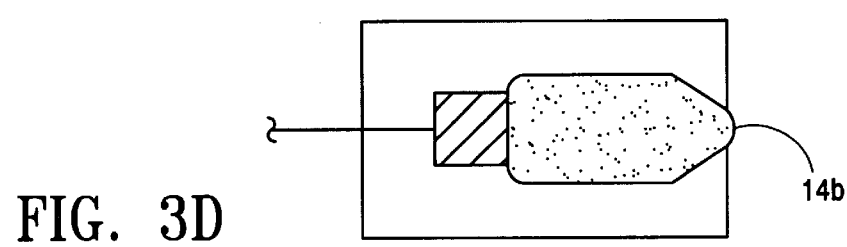
Figure 3E:
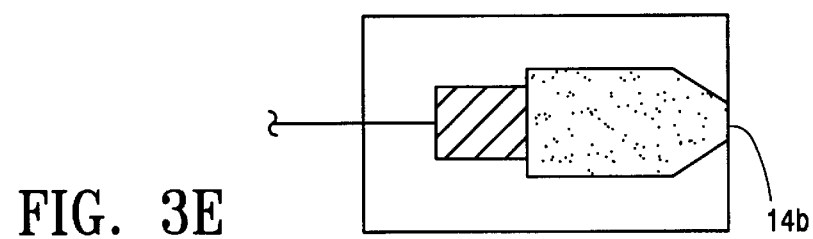

As discussed in the background section above, sub-pulsing techniques are known in the art whereby a signal of lesser amplitude is provided during quiescent periods to prevent the nozzle from clogging. FIGS. 3A–3E illustrated how the ink within a nozzle may react to a sub-pulse signal. As illustrated in FIG. 3A, the sub-pulse signal is typically of smaller amplitude and shorter duration than a full drop-ejecting pulse. As such, the pulse is sufficient to move the ink within the nozzle without ejecting it therefrom. Such a technique has been used when a printer is in a quiescent state to prevent fast drying solvent based inks from drying out and clogging the nozzle. (See for example, U.S. Pat. No. 4,459, 601, which is incorporated herein by reference, for a sub-pulsing scheme that applies pulses to the nozzle that are sufficient to move the ink within the nozzle and prevent clogging, but which are insufficient to eject ink droplets). The inventors believe that the sub-pulsing operates by constantly mixing the ink within the nozzle to maintain consistent viscosity.

In certain printing applications, it is advantageous to have an ink which has an extremely fast drying time. For some of the more fast drying inks, the mere application of sub-pulses would eventually increase the viscosity of the ink within the nozzle to a thick, unusable state. The present invention recognizes that allowing a fast-drying ink to dry in the nozzle forms a barrier of higher viscosity suspended solids between the nozzle orifice and the ink contained in chamber 15. The inkjet industry has generally tried to avoid such an effect because such a barrier would become a thick plug that would cause the nozzle to clog and operate inefficiently. Contradistinctly, the present invention utilizes this previously undesirable trait of fast-drying inks and uses it to a distinct advantage. In essence, by proper ink formulation, the barrier forms in such a manner as to advantageously control the evaporation of solvents within the ink. The result is ink within the chamber that maintains a relatively constant viscosity. According to an aspect of the invention, an ink is formulated to have extremely fast-drying properties so that during the quiescent period a viscosity barrier rapidly forms at the orifice of the nozzle. Solvent and resin based inks, as described more fully below, have demonstrated the desired properties.

As used herein, numerical ranges preceded by the term "about" should not be considered to be limited to the recited range. Rather, numerical ranges preceded by the term "about" should be understood to include a range accepted by those skilled in the art for any given element in impulse ink jet ink formulations according to the present invention.

Preferred fast-drying ink compositions comprise a solvent or a combination of solvents at from about 20 to about 95% by weight, a polymeric resin system at from about 1 to about 20% by weight, and a colorant at from about 1 to about 20% by weight.

The preferred fast-dying ink compositions comprise low-boiling solvents. Generally, the solvents selected have a boiling point below 150° C. Preferred low-boiling solvents include glycol alkyl ethers having about 3 to 20 carbon atoms, more preferably about 3–7 carbon atoms, and most preferably 4 carbon atoms, aketone alcohol, such as, for example, diacetone alcohol, 1,4-butanediol, denatured ethanol, benzyl alcohol, and alkyl lactates. Glycol alkyl ethers are particularly preferred. The preferred glycol alkyl ether is propylene glycol methyl ether. The ink compositions according to this invention can comprise any one of the above solvents or mixtures thereof. Preferably, such solvent or combination of solvents will be present in the inkjet ink composition at from about 20 to about 95% by weigh, more preferably at from about 50 to 90% by weight, and most preferably at from about 70 to about 88% by weight.

The preferred fast-drying ink compositions of this invention further comprise from about 1 to about 20% of a polymeric resin. Preferred polymeric resins include polyester resins, polyvinylbuterol resins, such as for example, MOWIFOL B3020H (commercially available from Hoechst, United Kingdom), phenolic resins, such as, for example, ALNOVOL PN 320 (commercially available from Hoechst, United Kingdom), and acrylic resins, such as styrene acrylic resin. The polymeric resin system of the ink compositions according to this invention can comprise any one of the above polymeric resins or mixtures thereof and preferably contain only those stated resins as the polymeric resin compound. Preferably, the ink composition comprises about 1 to about 20% by weight of an alcohol-soluble polyester-based resin and about 1 to about 10% by weight of a styrene acrylic polymer resin. More preferably, about 5 to 15% of the alcohol-soluble polyester-based resin and about 3 to about 6% by weight of the styrene acrylic polymer resin, and most preferably about 9% by weight of the alcohol-soluble polyester-based resin and about 4.5% by weigh of the styrene acrylic polymer resin. One preferred alcohol soluble polyester is Prince 5180, manufactured by Lawter International, Northbrook, Ill. One preferred styrene acrylic polymer is Joncryl 678, available from S. C. Johnson & Son, Inc.

Preferred ink compositions also comprise a colorant. The choice of colorant and its concentration principally depend on the solubility of the colorant and the intensity of its color for a particular application. Preferably, the colorant is selected to render the ink composition visible to the human eye or some mechanical data collection device, such as a bar code scanner or other type of optical character reader. A preferred colorant comprises a dye such as Orasol Black RLI, which is available from Ciba-Geigy Co. of Ardslcy, N.Y. Preferably, the colorant comprises from about 1 to about 20% by weight of the ink composition.

The fast drying impulse ink jet ink compositions for use in the present invention have been formulated to typically dry in from about 3 to about 35 seconds when used to print 150 dots per inch (DPI) text, and from about 5 to about 100 seconds for 150 DPI block characters. All print tests were performed with a Microcoder 32/16 printhead (commercially available from Trident International, Inc., Brookfield Conn.). As a baseline, the dry times were measured on a glass substrate at ambient temperature with no extraneous heating device applied. Measure dry times is typically an imprecise art. As referred to hereinafter, the dry times were obtained by measuring the time required to observe no visible smearing of the printed characters or blocks when rubbed with a substrate such as, for example, paper or a cotton swab. Those skilled in the art will recognize that the drying times of the fast-drying impulse ink jet ink compositions of the present invention will vary based upon the composition of the solvent or solvents selected and the particular amounts of each solvent.

For example, one preferred ink jet ink composition that demonstrates the desired fast-drying properties has been prepared as follows:

| | |
|---|---|
| Propylene Glycol Methyl Ether (solvent) | about 44.0% |
| Diacetone Alcohol (solvent) | about 40.6% |
| Prince 5180 (resin) | about 6.3% |
| Joncryl 678 (resin) | about 1.7% |
| Orasol Black RLI (dye) | about 7.4% |

This formulation typically exhibits a dry time on a glass substrate of about 50 seconds for 150 DPI bock characters and about 19 seconds for 150 DPI text at ambient temperature. The ink jet ink formulation, when printing 150 DPI text on a high density polyethylene substrate, will dry in about 7 to 9 seconds at ambient temperature. On matte-coated, non-glossy stock paper, ink jet ink formulation will dry in about 3 to 4 seconds at ambient temperature when printing 150 DPI text.

In comparison, a more preferred inkjet ink composition that demonstrates the desired fast-dying properties has been prepared as follows;

| | |
|---|---|
| Propylene Glycol Methyl Ether (solvent) | about 22.5% |
| Denatured Ethanol (solvent) | about 55.0% |
| Benzyl Alcohol (solvent) | about 5.0% |
| Prince 5180 (resin) | about 9.0% |
| Joncryl 678 (resin) | about 4.5% |
| Orasol Black RLI (dye) | about 5.0% |

This formulation typically exhibits a dry time on a glass substrate of about 6 seconds for 150 DPI bock characters and about 3 seconds for 150 DPI text at ambient temperature. This ink jet ink formulation, when printing 150 DPI text on a high density polyethylene substrate, will dry in about 4 seconds at ambient temperature. On matte-coated, non-glossy stock paper, ink jet ink formulation will dry in about 2 seconds at ambient temperature when printing 150 DPI text.

Still, a most preferred ink jet ink composition that demonstrates the desired fast-drying properties has been prepared as follows:

| | |
|---|---|
| Propylene Glycol Methyl Ether (solvent) | about 80.0% |
| Diacetone Alcohol (solvent) | about 5.0% |
| Prince 5180 (resin) | about 6.3% |
| Joncryl 678 (resin) | about 1.7% |
| Orasol Black RLI (dye) | about 7.4% |

This formulation typically exhibits a dry time on a glass substrate of about 20 seconds for 150 DPI bock characters and about 8.0 seconds for 150 DPI text at ambient temperature.

In one embodiment of the present invention, water can be added to the fast-drying inkjet ink compositions as an additive to control an ink formulation's drying time, i.e., decrease the rate of drying, where especially fast-drying solvents are used, such as, for example, denatured ethanol. The water can be present at from about 1 to about 40% by weight. The particular amount of water used will depend on the volatility of the solvents used. The following fast-drying ink jet ink formulation illustrates another preferred fast-drying ink composition wherein water was added to control a dry time that was otherwise too fast to allow for control of the print quality:

| | |
|---|---|
| Denatured Ethanol (solvent) | about 67.0% |
| Distilled Water (additive) | about 10.0% |
| 1,4-butanediol (solvent) | about 3.0% |
| Mowifol B3020H (resin) | about 1.0% |
| Alnovol PN 320 (resin) | about 14.0% |
| Valifast 3806 (dye) | about 5.0% |

This formulation typically exhibits a dry time on a glass substrate of about 6.0 seconds for 150 DPI bock characters and about 3.0 seconds for 150 DPI text at ambient temperature. In comparison, this formulation, without the water added, would dry almost instantly and the print quality was difficult to maintain.

One skilled in the art will recognize that the fast-drying impulse ink jet ink formulations according to the present invention, not only readily form a viscosity barrier at the orifice of the nozzle as described above, but also eliminate the need for extraneous heating devices such as, for example, microwave heaters, forced hot air heaters, convection heaters, and the like, that are typically employed to increase the rate at which the ink dries on a substrate.

The ink composition of this invention may further comprise additional additives, so long as incorporation of the additives does not change the key drying properties as described in further detail below.

In another embodiment of the present invention, the ink compositions of the present invention further comprise from about 0.01 to about 2, more preferably, between 0.01 and 0.2 percent by weight of an antioxidant. Most preferably, the antioxidant constitutes about 0.2 percent by weight of the ink composition.

The antioxidant is selected for its ability to improve the dynamic throughput performance in the printhead. Cavitation is the formation of gas bubbles in a liquid and is caused by the presence of dissolved gases in the liquid. Inside of an impulse-type printhead, there is a piezo attached to a wall of a liquid chamber that expands and contracts causing an oscillating pressure field within the chamber. Formation of bubbles and the likelihood of their initial growth and subsequent shrinkage in the oscillating pressure field significantly reduce the printhead jetting performance.

It is especially important to control cavitation when using piezoelectric inkjet printheads having a higher number of orifices, such as, for example, the ULTRAJETII 192/32 printhead (commercially available from Trident International, Brookfield, Conn.) for at least two reasons. First, such larger printheads have a greater surface area which typically allows a grater opportunity for evaporation. Second, the greater number of orifices typically increase the opportunity for air entrainment as a result of the operation of the piezo, as described above.

Suitable antioxidants for use with fast-drying inkjet ink compositions are disclosed in co-pending U.S. patent. Application Ser.No. 09/328,652, filed on Jun. 9, 1999, which is incorporated herein by reference. Examples of such antioxidants include, for example, eugenol, hydroquinone, pyrocatechol, guaiacol (methyl catechol), butylated hydroxytoluene, butylated hydroxyanisole, methyl ethyl ketoxime, butylaldoxime, and cyclohexanone oxime.

In accordance with the invention, the ink composition is selected so that a viscosity barrier of suspended solids, and which may actually become a solid, is allowed to form over the orifice of the nozzle during quiescent periods that exceeds predetermined time period, which is selected based on the ink formulation and other factors. Thereafter, when printing is requested, sub-pulsing is activated before printing can resume to remove the viscosity barrier by re-homogenizing it with fresh ink. While not wishing to be bound by any particular theory, it is believed that the theoretical explanation for the operation of the viscosity barrier is as described in further detail below.

Figure 4A:
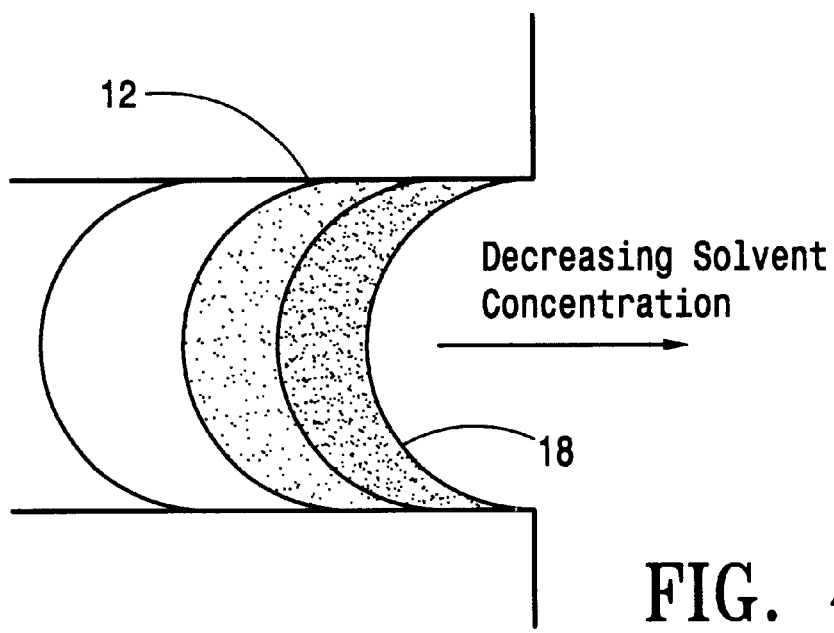
FIG. 4 is a diagram of the barrier formed on the meniscus of the ink within the nozzle.

Without sub-pulsing, a solvent concentration gradient is rapidly formed at the surface of the ink in the nozzle orifice as the volatile solvent evaporates (see FIG. 4A). Formation of this viscoity gradient or barrier 18 dramatically slows the rate of solvent loss from nozzle 12. Unlike many inks, with a properly selected ink, such as the formulation described above, re-homogenization readily occurs under perturbing action of the sub-pulse. Thus, by first sub-pulsing a nozzle containing the fast-drying ink, a nozzle 12 that has been dormant for an hour or more can be successfully fired again after a few seconds of sub-pulsing.

Figure 4B:
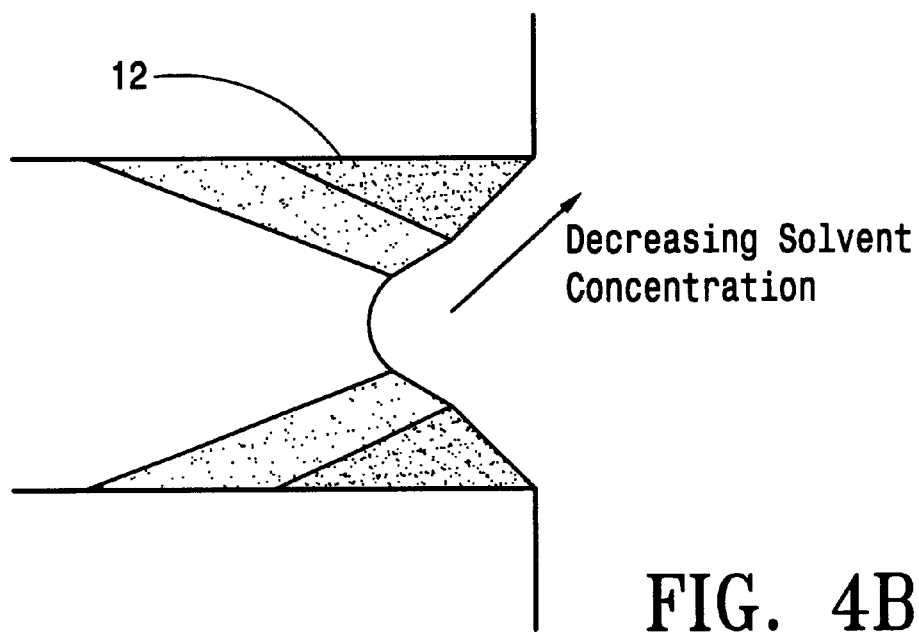

By contrast, if a constant sub-pulsing system is applied to such a fast drying ink, such as the preferred ink described above, the ink viscosity within nozzle 12 will rise too high and produce poor print performance. In such a system, it is believed that the sub-pulsing generates eddy currents which agitate the ink in nozzle 12, maintaining it homogeneity. As a result, fresh solvent is continuously being presented at the nozzle orifice and no viscosity gradient is formed. Over extended periods of sub-pulsing, the solvent level in nozzle 12 becomes extremely depleted causing the viscosity of the ink to rise significantly, especially at the edges of nozzle 12 where the sub-pulsing has the least effect (see FIG. 4B).

Figure 5:
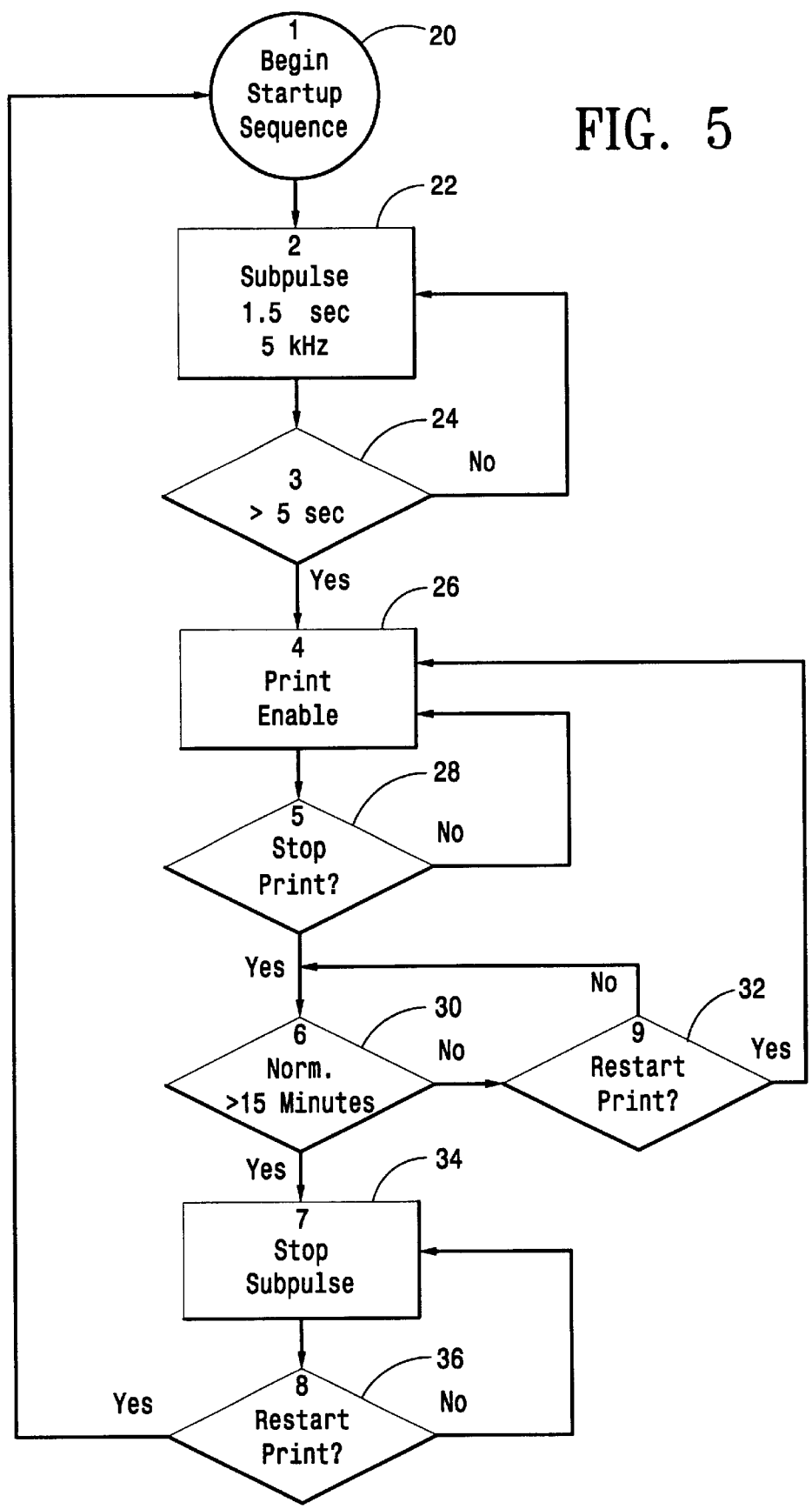
FIG. 5 is a flowchart of the sequence of firing and sub-firing signals.

The preferred sequence of steps to employ the viscosity barrier and the sub-pulsing are shown in the flow chart of FIG. 5. The startup sequence begins whenever a nozzle has been idle for an extended period of time (step 20). After startup, nozzle 12 is sub-pulsed for a predetermined period. Preferably, the sub-pulses have a pulse width of about 1.5$\mu$ seconds and have a frequency of about 5 kHz (step 22). The sub-pulse amplitude is selected to move the ink yet insufficient to eject the ink from nozzle 12. The particular sub-pulse parameters were selected to operate effectively with the preferred ink. Other parameters may be substituted and produce similar results, particularly where the ink formulation is different from the preferred ink disclosed herein. The predetermined period of sub-pulsing time is the time required to ensure that the ink in he nozzle is re-homogenized with fresh ink from the chamber. It has been determined that 5 seconds is sufficient time to break-down the viscosity barrier that is formed by the preferred ink formulation described above. Of course, other re-homogenization periods could be used depending on the particular characteristics of the ink selected and the quality of operation desired. After the 5 second period (step 24), the print function of the nozzle is enabled (step 26). The nozzle is then available to eject droplets on demand until printing is complete and returns to a quiescent state (step 28).

While the printer is active and for a period thereafter, sub-pulsing of the ink can continue to maintain a constant viscosity of the ink as with constant sub-pulsing system. That is, just as with constant sub-pulsing systems, the system disclosed herein contemplates that the printer can remain enabled with constant sub-pulsing on for some predetermined period of time without clogging the nozzle or raising the ink viscosity to an unusable level.

However, if the printer remains idle for an extended period (about 15 minutes in the present example), the sub-pulsing should cease, allowing the viscosity barrier 18 to form over the orifice (see also FIG. 4A). Accordingly, a timer is set for about 15 minutes during which time printing can restart on demand (steps 30, 32). After that time has expired, sub-pulsing is stopped and restarting requires completion of the start-up sequence to re-homogenize the viscosity barrier (steps 34, 36).

Those skilled in the art will appreciate that numerous changes and modifications may be made to the preferred embodiments of the invention and that such changes and modifications may be made without departing from the spirit of the invention. For example, instead of generating control signals as in the present invention by modulating the amplitude of applied electric energy, it may be possible generate such signals by modulating applied light energy or heat. Moreover, other fast drying inks using completely different formulations could be used, so long as they exhibit the desired fast-drying properties. It is therefore intended that the appended claims cover all such equivalent variations as fall within the true spirit and scope of the invention.

What is claimed is:

1. A fast-drying ink composition for use in impulse ink jet printers, comprising:
    a) from about 20 to about 95 percent by weight of a solvent comprising a glycol alkyl ether having about 3 to 20 carbon atoms, a ketone alcohol, 1,4-butanediol, denatured ethanol, benzyl alcohol, an alkyl lactate, or mixtures thereof;
    b) from about 1 to about 20 percent by weight of a polymeric resin comprising a polyester resin, a polyvinylbuterol resin, a phenolic resin, an acrylic resin, or mixtures thereof; and
    c) from about 1 to about 20 percent by weight of a colorant, wherein said solvent has a boiling point below 150° C.

2. The fast-drying ink composition of claim 1 wherein the solvent is present at from about 60 to 90 percent by weight of the ink composition.

3. The fast-drying ink of claim 2 wherein the solvent comprises propylene glycol methyl ether and diacetone alcohol.

4. The fast-drying ink of claim 2 wherein the solvent comprises propylene glycol methyl-ether and benzyl alcohol.

5. The fast-drying ink composition of claim 1 wherein the glycol alkyl ether has about 3 to about 7 carbon atoms.

6. The fast-drying ink composition of claim 1 wherein the solvent comprises propylene glycol methyl ether.

7. The fast-drying ink composition of claim 1 wherein the solvent comprises diacetone alcohol.

8. The fast-drying ink of claim 7 wherein the water comprises from about 1 to about 20% of the ink composition.

9. The fast-drying ink of claim 7 wherein the water comprises from about 1 to about 10% of the ink composition.

10. A method of operating an impulse ink jet printer having at least one nozzle, comprising the steps of:
    exposing a portion of ink contained in said nozzle to air such that a barrier of higher viscosity forms in the ink, wherein said ink comprises:
        a) from about 20 to about 95 percent by weight of a solvent comprising a glycol alkyl ether having about 3 to 20 carbon atoms, a ketone alcohol, 1,4-butanediol, denatured ethanol, benzyl alcohol, an alkyl lactate, or mixtures thereof;
        b) from about 1 to about 20 percent by weight of a polymeric resin comprising a polyester resin, a polyvinylbuterol resin, a phenolic resin, an acrylic resin, or mixtures thereof, and
        c) from about 1 to about 20 percent by weight of a colorant, wherein said solvent has a boiling point below 150° C;
    generating a plurality of sub-pulsing signals, said sub-pulsing signals having amplitudes which are effective to remove the barrier yet which are ineffective to eject droplets of ink; and
    generating a plurality of firing signals, said firing signals having amplitudes which are effective to eject droplets of ink from said nozzle.

11. The method of claim 10 wherein the solvent is present at from about 60 to 90 percent by weight of the ink composition.

12. The method of claim 10 wherein the solvent comprises propylene glycol methyl ether and diacetone alcohol.

13. The method of claim 10 wherein the solvent comprises propylene glycol methyl ether and benzyl alcohol.

14. The method of claim 10 wherein the glycol alkyl ether has about 3 to about 7 carbon atoms.

15. The method of claim 10 wherein the solvent comprises propylene glycol methyl ether.

16. The method of claim 10 wherein the solvent comprises diacetone alcohol.

17. The fast drying ink of claim 10 wherein the water comprises from about 1 to about 20% of the ink composition.

18. The fast-drying ink of claim 10 wherein the water comprises from about 1 to about 10% of the ink composition.

19. A fast-drying ink composition for use in impulse ink jet printers, comprising:
    a) from about 70 to about 90 percent by weight of a solvent comprising a mixture of a glycol alkyl ether having about 3 to 20 carbon atoms and a ketone alcohol;
    b) from about 6 to about 10 percent by weight of a polymeric resin comprising a polyester resin, a polyvinylbuterol resin, a phenolic resin, an acrylic resin, or mixtures thereof; and
    c) from about 5 to about 8 percent by weight of a colorant, wherein said solvent has a boiling point below 150° C.

20. The fast-drying ink composition of claim 19 wherein the solvent is a mixture of propylene glycol methyl ether and diacetone alcohol.

21. A method of operating an impulse ink jet printer having at least one nozzle, comprising the steps of:
    exposing a portion of ink contained in said nozzle to air such that a barrier of higher viscosity forms in the ink, wherein said ink comprises:
        a) from about 70 to about 90 percent by weight of a solvent comprising a mixture of a glycol alkyl ether having about 3 to 20 carbon atoms and a ketone alcohol;
        b) from about 6 to about 10 percent by weight of a polymeric resin comprising a polyester resin, a polyvinylbuterol resin, a phenolic resin, an acrylic resin, or mixtures thereof; and c) from about 5 to about 8 percent by weight of a colorant, wherein said solvent has a boiling point below 150° C.;

generating a plurality of sub-pulsing signals, said sub-pulsing signals having amplitudes which are effective to remove the barrier yet which are ineffective to eject droplets of ink; and generating a plurality of firing signals, said firing signals having amplitudes which are effective to eject droplets of ink from said nozzle.

22. The method of claim 21 wherein the solvent is a mixture of propylene glycol methyl ether and diacetone alcohol.

* * * * *

UNITED STATES PATENT AND TRADEMARK OFFICE
CERTIFICATE OF CORRECTION

PATENT NO. : 6,302,536 B1
DATED : October 16, 2001
INVENTOR(S) : Sarma et al.

Page 1 of 1

It is certified that error appears in the above-identified patent and that said Letters Patent is hereby corrected as shown below:

Column 1,
Line 54, please delete "Juliana, Jr., et aL" and insert therefor -- Juliana, Jr. et al. --;

Column 2,
Line 61, please delete "inn" and insert therefor -- in an --.

Signed and Sealed this

Twenty-first Day of May, 2002

Attest:

JAMES E. ROGAN
*Attesting Officer*  *Director of the United States Patent and Trademark Office*